March 27, 1934.  E. D. TILLYER  1,952,394
LENS
Filed July 30, 1932
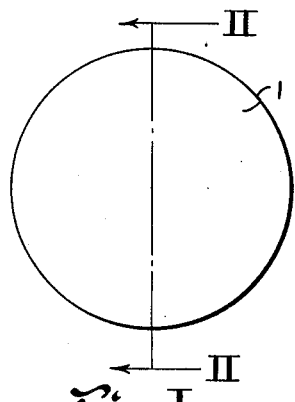
Fig. I
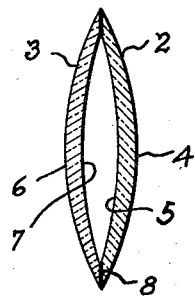
Fig. II
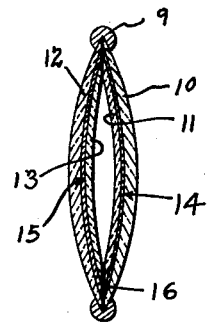
Fig. III
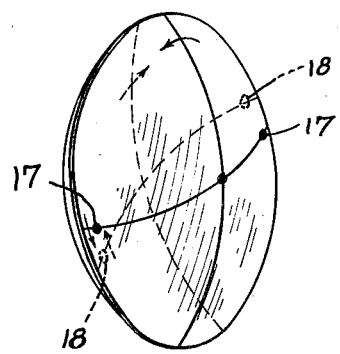
Fig. IV
INVENTOR
Edgar D. Tillyer.
BY
Harry H. Styll
ATTORNEY Patented Mar. 27, 1934

1,952,394

UNITED STATES PATENT OFFICE 1,952,394

LENS

Edgar D. Tillyer, Southbridge, Mass., assignor to American Optical Company, Southbridge, Mass., a voluntary association of Massachusetts Application July 30, 1932, Serial No. 626,558

3 Claims. (Cl. 88—54)

This invention relates in general to lenses, and more particularly has reference to an improved lens for correcting errors in size of image as seen by a patient, while at the same time correcting other errors of the eye.

One object of this invention is, therefore, to produce a lens which will correct both errors of size and errors of focus in an eye.

Another object is to produce a lens having four surfaces upon which corrective or prescription curves may be formed.

Another object is to provide a lens by which different corrections for size of image may be made in one or two meridians at the same time, as focal power corrections are made in one or two meridians, which may have the same or different axes from the first group.

Another object of this invention is to provide a lens on which two or more toric surfaces may be formed and positively aligned with respect to each other after they are formed.

Other objects and advantages will become apparent from the following description taken in connection with the accompanying drawing, and it will be apparent that many changes can be made in the details of construction and arrangement of parts without departing from the spirit of the invention as expressed in the accompanying claims. I therefore do not wish to be limited to the exact details shown and described, as the preferred form only has been shown by way of illustration.

Referring to the drawing:

Figure I is a face view of a lens embodying this invention.

Figure II is a sectional view taken along the line II—II of Figure I, and showing the details of construction.

Figure III is a view similar to Figure II, illustrating a modification.

Figure IV is a perspective view illustrating the method of aligning the respective surfaces of the lens of this invention.

In the past it has been customary to form lenses of various types with different curvatures on the two outer surfaces thereof for the purpose of making corrections of various types of optical errors. These corrections have, however, been limited to those which could be made by varying the characteristics of two curved surfaces. If a correction required more than two curved surfaces, it was necessary to use two separate lenses mounted separately in frames, one in front of the other. This, obviously, produced a structure which was unsightly in appearance, as well as possessing other disadvantages. It was necessary to make the frames holding these two lenses so that they could be separated, in order that the surfaces between the two lenses might be cleaned from time to time, and at the same time it was necessary that the distance between the two lenses should be maintained to a very accurate degree in order to keep from altering the optical effect of the combination.

Recently there has come into use a type of lens having substantially no focal power, but having curves upon its optical surfaces, such that they will change the size of the image as seen by the eye. When the over all size of the image is to be changed, these curves on the optical surface of the lens are spherical, but when the size of the image is to be changed by different amounts in different meridians it becomes necessary to put toric curves on the opposite side of the lens. These toric curves must obviously be properly placed with respect to each other, that is, the axes must be properly lined up in order that they may produce the desired effect. With either of these types of lenses, if it were necessary at the same time to correct the focus of the eye, it would be necessary to put another lens in series with the size lens, this introducing the disadvantages above mentioned.

In connection with the lenses having toric surfaces on both faces thereof, commonly known as bitoric lenses, there has never been designed a thoroughly satisfactory method of producing them. Of course, the most important factor in the production of these lenses is that the axes be very accurately located with respect to each other. The most common method which has been employed in attempting to produce lenses of this kind has been to block the lens blank in the ordinary manner and grind the toric surface on one side, then block it with the other side up with the axes as nearly in alignment as possible with the tool, and grinding the second toric surface.

As will be readily apparent, it is extremely difficult, if not impossible, to produce a lens with its axes accurately and properly aligned, by this method. The matter of aligning the lens with one surface ground on it so that the other surface would be in proper alignment was, at best, more or less hazardous and a guesswork proposition. One of the principal objects of this invention is, therefore, to produce a bitoric lens in which the axes of the two toric surfaces may be more accurately aligned than has been possible in the prior art methods, and at the same time provide a lens having two extra surfaces upon which curves for producing additional corrections may be placed.

It is also another object of this invention to provide a lens in which the effect of two lenses may be attained, while at the same time eliminating the defects inherent in the use of two separate lenses.

Referring now more particularly to the drawing, there is shown in Figures I and II a lens embodying the invention herein described, the same being designated generally by the numeral 1.

This lens 1 is composed of two parts, 2 and 3, as shown in Figure II. The part 2 is provided with two surfaces 4 and 5, and the part 3 with two surfaces, 6 and 7, as illustrated. As will be seen also from Figure II, each of the portions 2 and 3 is provided adjacent its outer edge with an annular seat 8, which is preferably flat and adapted to fit against the corresponding seat upon the other part. The parts 2 and 3 may have spherical surfaces on one side, and toric surfaces on the other side in each case, as for instance, if the surfaces 4 and 6 were toric surfaces and the surfaces 5 and 7 were spherical surfaces. In any instance, it would be necessary to form the seat, the portion 8, on the respective parts, and to grind the surfaces 4, 5, 6 and 7 before placing the parts together. After this is done, the parts are placed together with the seats 8 in contact with each other, and the lenses are rotated about their axes with respect to each other until the two toric surfaces are properly related. The lenses are then secured together, preferably by means of cement, although they may be held together by being placed in a frame, as illustrated in connection with the lens in Figure III.

It will be apparent in connection with this lens that if the surfaces 4 and 6 are made toric, the surfaces 5 and 7 will then be available for grinding other curves in order to correct other possible defects in an eye.

In the modified form of lens shown in Figure III, each of the parts of the lens is made up of two elements, consisting of pieces of glass, 10 and 11, in the one case, and 12 and 13 in the other case. These pieces of glass are provided with curves on one face of each piece, which are preferably spherical. Thus, the pieces 10 and 11 have spherical curves on their adjacent surfaces, such that they will fit together with a snug fit throughout their surfaces. The pieces 12 and 13 are likewise provided with spherical surfaces between them so that they will fit together. These pieces are then joined to each other along these complementary spherical surfaces by means such as cement 14 and 15.

As will readily be seen, by forming the lenses in the manner just described, it will be possible to make each element of the complete lens in the form of a bitoric lens with its axes accurately aligned. The process of aligning the elements of these individual parts of the major or completed lens is substantially the same as that described in connection with the structure shown in Figure II. The elements 10 and 11, for example, are thus placed together and rotated until the toric surfaces are properly positioned with respect to each other. After the elements 10 and 11 have been secured to each other, and after the elements 12 and 13 have been secured to each other, the two bitoric lenses can be united, forming a composite lens similar to that shown in Figure II.

By virtue of the lens construction shown in Figure III it becomes possible not only to change the magnification or size of the image in two meridians, but also to change the focal power in two more meridians if necessary. Moreover, the relative position of these four meridians is adjustable by means of rotating the various elements of the lens with respect to each other, before they are finally assembled and secured together.

As is shown in Figure III, the parts of the lens may be secured together by means of the frame 9, but preferably a cement layer 16 is also used.

The lenses of both Figure II and III, as will be seen, are composed of two glass lenses in contact at their edges and forming between them a convex air lens.

The method of rotating one part of the lens in respect to another in order to secure proper alignment of axes before the parts are secured together, is illustrated in Figure IV. As will be seen, the axes of the toric surfaces on the respective parts are first marked by some means, such as the dots 17 and 18; and then the parts are placed together and rotated until these marks bear the proper relation with respect to each other. If it is desired to unite the various parts by cement, as above set forth, it is desirable to place this cement in a more or less liquid form between the parts before they are brought into alignment. Then, when the parts are aligned, it is merely necessary to allow or cause this cementitious material to harden and firmly join the parts.

In any event, after the lenses are marked for axis and stuck together, they are placed in a lens measuring instrument, such as is well known, and the adjustment of axes is verified and corrected if need be before the lenses are rigidly secured to each other.

It has also been found that a lens of this type, in which one of the elemental lenses is positive or plus power and the other minus power, will have a much greater magnifying effect in comparison with its focal power, because of the air space or air lens between the two glass lenses.

It will be seen from the above description that there has been provided by this invention a means which carries out all of the objects set forth above. It is possible by the structure just described to form a lens which has not only two, but four, possible surfaces for controlling the optical characteristics of the lens, and for correcting various defects of an eye.

In view of the recent development in optical science, it is clear that a lens of this kind will prove to be a distinct advance and a great advantage to further development along this line.

Having described my invention, I claim:

1. A lens having two compound lens elements, one element comprising a lens section with a lens surface on its outer face which departs from a true spherical curvature and a desired optical surface on its inner face and a lens section having an optical surface complementary to and fitting the inner surface of the first section and a desired optical surface on its other side, and said sections being secured together with their complementary surfaces engaging each other, and the other element comprising a lens section having a desired outer optical surface and a desired inner optical surface and another section having an optical surface on one side complementary to the inner surface of the other section and fitting therewith, and a desired optical surface on the other side, said sections being secured together with their complementary surfaces engaging each other, and the said compound lens elements having complementary annular peripheral zones on their inner surfaces and said elements being secured together with said complementary zones engaging each other.

2. The process of making a lens having an outer surface which departs from a true spherical curvature comprising forming a lens surface on one side of a lens blank which surface departs from a true spherical curvature, forming a desired lens surface on the other side of the blank, forming desired lens surfaces on the respective sides of another lens blank, the inner surface of which is not complementary with the inner surface of the other blank, locating the axis of the nonspherical surface, placing the two blanks with their inner surfaces marginally contacting with each other, moving one blank with respect to the other until the axis of the nonspherical surface is in desired relation with the other blank and securing the two blanks together in said position with their marginal contacting portions engaging each other.

3. The process of making a lens having an outer surface which departs from a true spherical curvature comprising forming a lens surface on one side of a lens blank which surface departs from a true spherical curvature, forming a desired lens surface on the other side of the blank, forming a second lens blank with a lens surface on one side complementary to the lens surface opposite the nonspherical surface, and with a desired lens surface on the other side, securing the two blanks together with their complementary surfaces engaging each other, forming another lens blank with desired lens surfaces on the respective sides thereof, forming another lens blank with a lens surface on one side complementary to the inner surface of the other blank and the other side with a desired lens surface, securing the two blanks together with their complementary surfaces engaging each other, forming a marginally contacting zone on the inner surfaces of the two composite blanks, locating the axis of the nonspherical surface, placing the two composite blanks together on their contacting surfaces, moving one composite blank with respect to the other until the axis of the nonspherical surface is in desired position and securing the two composite blanks together in this position with their contacting surfaces engaging each other.

EDGAR D. TILLYER.